L. J. BAZZONI.
Vehicle-Spring.
No. 199,016. Patented Jan. 8, 1878.
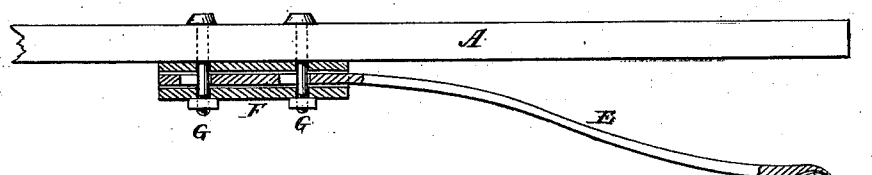
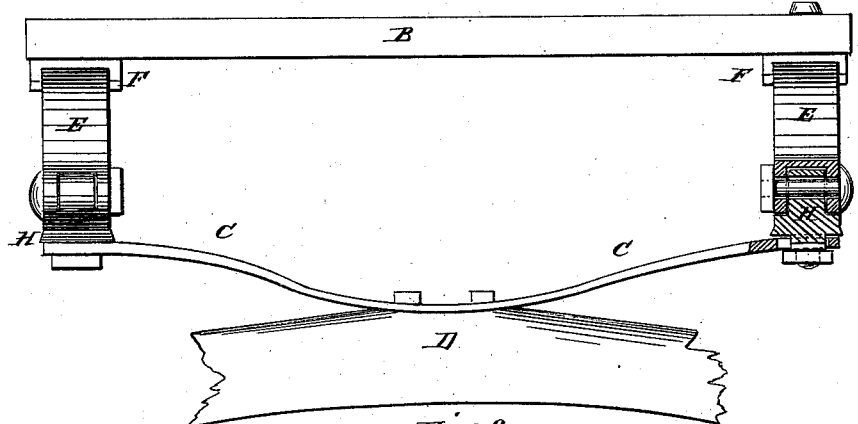
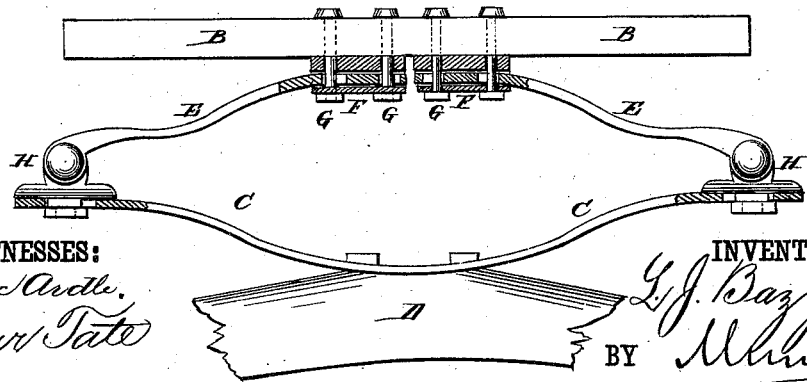
WITNESSES:
F. McArdle
Edgar Tate
INVENTOR:
L. J. Bazzoni
BY
ATTORNEYS.

UNITED STATES PATENT OFFICE.

LEWIS J. BAZZONI, OF NEWBURG, NEW YORK.

IMPROVEMENT IN VEHICLE-SPRINGS.

Specification forming part of Letters Patent No. 199,016, dated January 8, 1878; application filed November 2, 1877.

*To all whom it may concern:*

Be it known that I, LEWIS J. BAZZONI, of Newburg, in the county of Orange and State of New York, have invented a new and useful Improvement in Half-Spring Wagons, of which the following is a specification:

Figure 1 is a side view of one of my improved springs shown as applied to a side bar or body-frame, and partly in section to show the construction. Fig. 2 represents the springs arranged at right angles with the main or half spring. Fig. 3 represents the springs arranged parallel with the main or half spring.

Similar letters of reference indicate corresponding parts.

The object of this invention is to connect the side bars or body-sills of wagons with the ends of the half-springs in such a way as to give freedom of motion lengthwise and sidewise, so as to prevent all twisting and straining of the side bars or sills and of the main spring.

The invention will first be described in connection with the drawings, and then pointed out in the claim.

A represents the side bar or the body-sill of a wagon. B represents the cross-bar. C represents the main or half spring, and D represents the axle or head-block.

E represents a short spring, of one or more plates, the upper end of which is inserted in a socket, F, secured to the side bar of a side-bar wagon, or to the sill or cross-bar of a wagon-body, by bolts G.

The upper ends of the short spring E has short slots formed in it for the bolts G to pass through, to give the said spring E a longitudinal movement or play. The lower end of the short spring E is pivoted or hinged to a lug-bolt, H, or other suitable coupling, the shank of which passes through a short slot formed longitudinally in the end of the main or half spring C, so as to give the said short spring a lateral or sidewise movement or play. This movement may also be obtained by passing the end of the half-spring through a keeper attached to and forming a part of the coupling that connects said half-spring with said short spring.

This construction gives great freedom of movement to the short springs E, and prevents all twisting or straining of the parts connected by said short springs, and at the same time makes the wagon much more elastic.

The short springs E may be placed at the sides of the wagon, and thus at right angles with the main or half springs, as shown in Figs. 1 and 2; or they may be placed at the ends of the wagon, and thus parallel with the main or half springs, as shown in Fig. 3.

Having thus described my invention, I claim as new and desire to secure by Letters Patent—

The short plate-springs E, secured at upper end in a socket, F, of side bar or cross-bar, and pivoted at the lower end to a lug-bolt, H, of the half-spring E, as shown and described.

LEWIS JAMES BAZZONI.

Witnesses:
P. HOUSER,
GEORGE ARMSTRONG.